(12) United States Patent
Karaman

(10) Patent No.: US 7,491,337 B2
(45) Date of Patent: Feb. 17, 2009

(54) METHOD AND APPARATUS FOR REMOVING CONTAMINANTS FROM WATER

(75) Inventor: Marilyn E. Karaman, Aranda (AU)

(73) Assignee: Jeffbrad Investments Pty Limited (AU)

( * ) Notice: Subject to any disclaimer, the term of this patent is extended or adjusted under 35 U.S.C. 154(b) by 338 days.

(21) Appl. No.: 11/018,938

(22) Filed: Dec. 21, 2004

(65) Prior Publication Data

US 2005/0236335 A1    Oct. 27, 2005

(51) Int. Cl.
*B01D 21/01* (2006.01)
(52) U.S. Cl. .................. 210/723; 210/724; 210/725; 210/199
(58) Field of Classification Search ......... 210/723–725, 210/199
See application file for complete search history.

(56) References Cited

U.S. PATENT DOCUMENTS

| 4,043,904 | A | 8/1977 | Takeda et al. | |
|---|---|---|---|---|
| 6,398,964 | B1 | 6/2002 | Brady et al. | |
| 6,582,873 | B2 * | 6/2003 | Jiang et al. | ............. 430/137.14 |

FOREIGN PATENT DOCUMENTS

| CN | 1508077 A | 6/2004 |
|---|---|---|
| DE | 4125990 A1 | 2/1993 |
| EP | 1146016 A | 10/2001 |
| EP | 1146016 A1 | 10/2001 |
| HU | 54324 A | 2/1991 |
| HU | T054-324 A | 2/1991 |
| JP | 5047-177 | 3/1980 |
| JP | 55-047177 A | 4/1980 |
| JP | 55-137082 A | 10/1980 |
| JP | 58-049490 A | 3/1983 |
| JP | 8049-490 | 3/1983 |
| JP | 03-021392 A | 1/1991 |
| JP | 3021-392 A | 1/1991 |
| JP | 07-080473 A | 3/1995 |
| JP | 07-080497 A | 3/1995 |
| JP | 07080497 A | 3/1995 |
| JP | 2002/316171 A | 4/2001 |
| JP | 2001162276 A | 6/2001 |
| JP | 2002-316171 A | 10/2002 |
| SU | 1632948 A | 3/1991 |
| SU | 1632-948 A | 7/1991 |

OTHER PUBLICATIONS

Australian Patent Office International-Type Search Report, from AU 2004906259, mailed Dec. 22, 2004.
International Search Report, from PCT/AU2005/000568, mailed May 12, 2005.

* cited by examiner

*Primary Examiner*—Chester T Barry
(74) *Attorney, Agent, or Firm*—Wolf, Greenfield & Sacks, P.C.

(57) ABSTRACT

A method and apparatus is provided for the purification of water, in particular to the removal of surfactants and optionally organic, inorganic and/or biological contaminants from water using adsorption filtration techniques.

37 Claims, 6 Drawing Sheets

METHOD AND APPARATUS FOR REMOVING CONTAMINANTS FROM WATER

RELATED APPLICATIONS

This application claims priority under 35 U.S.C. § 119 to Australian Application No. AU 2004 902186, filed Apr. 23, 2004, and Australian Application No. AU 2004 906259, filed Oct. 29, 2004.

TECHNICAL FIELD

The present invention is directed to a method and apparatus for the purification of water, in particular to the removal of surfactants and optionally organic, inorganic and/or biological contaminants from water using adsorption filtration techniques.

BACKGROUND ART

High quality drinking water is becoming scarce in many areas of the world. With little scope for expanding water supply catchments and increasing consumption, the purification of water is of great importance. The degree of water purification will depend on the extent to which the water is contaminated and the ultimate use of the water. Water intended for human or animal consumption and/or contact will require a higher degree of purification than water that is intended for the purpose of toilet flushing, laundry use, garden and agricultural irrigation, and industrial processes.

There exists a number of water treatment practices used to render contaminated water safe for human contact and/or consumption.

During the production of potable water clays, particulates and pathogenic organisms are removed by coagulation with coagulants such as ferric chloride or alum, followed by the addition of polyelectrolytes as coagulant aids and in some cases high molecular polymeric organic filter aids. The coagulated material is removed by either sedimentation or filtration through sand filters.

"Grey water" treatment is of increasing importance due to the large quantities produced by industrial laundries and households. Grey water is waste water which is not grossly contaminated by faeces or urine and generally arises from plumbing fixtures not designed to receive human excrement or discharges. Grey water includes bath tub, shower, hand basin, laundry tub, spa bath, washing machine and kitchen discharges. Grey water characteristics vary between households and depend upon the dynamics of the household, the age and number of occupants, the lifestyle of the occupant and water usage characteristics of the occupant.

Grey water contains variable quantities of inorganics (e.g. dissolved salts such as phosphates, nitrates etc), organics (e.g. oils, greases, soap, toothpaste, shampoo/conditioner, hair dyes, surfactants and cleaning chemicals), physical impurities (e.g. dirt, food, sand, lint, hair, blood, urine, faeces etc) and micro-organisms (e.g. bacteria, viruses, protozoa etc) which arise from household and personal hygiene practices. As grey water accounts for the majority of waste water produced by each household it is desirable to purify this water for further use in a manner that protects public health and meets health guidelines.

Grey water treatment reuse can range from simple grey water diversion devices (GDD) to sophisticated treatment systems. The grey water diverting devices do not treat the grey water waste but divert the discharge through coarse screens to remove materials which would clog pumps, block pipes and burden the pollutant load before it is used for sub-surface irrigation.

Currently there are a number of processes used to treat grey water discharge. These include primary treatment which reduces the gross primary pollutant load of the waste water through the settling of solids, flotation, anaerobic digestion, filtration, aeration, clarification and finally disinfection. Secondary pollutants such as nitrates, phosphates, boron, sodium etc are not reduced by this type of treatment.

Water treatment processes are not completely reliable for the removal of pathogenic micro-organisms. Accordingly, as a final stage in the treatment of grey water and other water treatment processes, conventional chemical disinfectants, such as chlorine or ozone, are added to the treated water in order to destroy common water borne pathogenic microorganisms. Some microorganisms, however, are unaffected by such conventional treatments and the potential of such microorganisms entering water destined for human contact and/or consumption poses serious public health concerns.

Thus, whilst there are a number of processes well recognised for the treatment of water sources, especially grey water, a significant problem remains in the ability to selectively remove a range of contaminants, such as surfactants, organic, inorganic and/or biological contaminants, from water to meet extremely strict regulatory requirements in relation to pH, turbidity, thermotolerant coliforms for suitability in surface irrigation, reuse and/or consumption. Conventional water treatment practices have proven ineffective in the selective removal of such a cocktail of contaminants.

There is clearly a need for a method of selectively removing contaminants, especially a range of contaminants, from contaminated water.

SUMMARY OF THE INVENTION

The present inventors have developed a method of selectively removing a range of contaminants from water using adsorption filtration, a method they have coined "Active Adsorption Filtration". "Active Adsorption Filtration" provides a means to selectively and specifically remove contaminants from water thereby rendering contaminated water safe for human contact, reuse and/or consumption.

The present inventors have surprisingly discovered that by contacting contaminated water with a pH adjusting agent or medium followed by consecutive treatment stages with active adsorption media, wherein the charge on each active adsorption medium is influenced by the nature of the pH adjusting medium, it is possible to selectively remove one or more surfactants and preferably a range of organic, inorganic and/or biological contaminants from the water.

In a first aspect, the present invention is directed to a method for the removal of one or more cationic, anionic and/or nonionic surfactants and optionally one or more organic, inorganic and/or biological contaminants from water, the method comprising:

a) contacting the water with a pH adjusting agent/medium for a time and under conditions to provide a pH adjusted water; followed by contacting the pH adjusted water with one or more of the following active adsorption media:

b) a first medium that has a negative charge in the pH adjusted water for a time and under conditions such that a proportion of cationic surfactants present in the water are adsorbed onto said medium and removed from the water;

c) a second medium that has a positive charge in the pH adjusted water for a time and under conditions such that a proportion of anionic surfactants present in the water are adsorbed onto said medium and removed from the water;

d) a third medium that has a high surface area, is porous, adsorbs hydrophobic uncharged material and/or adsorbs hydrophobic charged material in the pH adjusted water, for a time and under conditions such that a proportion of non-ionic surfactants present in the water are adsorbed onto said medium and removed from the water;

and optionally, contacting the pH adjusted water with one or more of the following media:

e) one or more media for removing organic contaminants for a time and under conditions such that a proportion of the organic contaminants present in the water are adsorbed onto said media and removed from the water;

f) one or more media for removing inorganic contaminants for a time and under conditions such that a proportion of the inorganic contaminants present in the water are adsorbed onto said media and removed from the water;

g) one or more media for removing biological contaminants for a time and under conditions such that a proportion of the biological contaminants present in the water are adsorbed onto said media and removed from the water.

In a second aspect, the present invention is directed to purified water prepared according to the method described in the first aspect of the invention.

In a third aspect, the present invention provides an apparatus for removing one or more cationic, anionic and/or non-ionic surfactants and optionally one or more organic, inorganic and/or biological contaminants from water, the apparatus comprising:

i) a pH adjusting region for contacting the water with a pH adjusting agent/medium to provide a pH adjusted water;

ii) one or more of the following active media:
  a) a medium that has a negative charge in the pH adjusted water for removing cationic surfactants;
  b) a medium that has a positive charge in the pH adjusted water for removing anionic surfactants;
  c) a medium that has a high surface area, is porous, adsorbs hydrophobic uncharged material and/or adsorbs hydrophobic charged material in the pH adjusted water, for removing non ionic surfactants;

and optionally one or more of the following active media:
  d) one or more media for adsorbing organic contaminants from the water;
  e) one or more media for adsorbing inorganic contaminants from the water;
  f) one or more media for adsorbing biological contaminants from the water;

wherein one of the above active media is a first active medium having an inlet for the pH adjusted water and one of the above active media is a last active medium that has an outlet for the water; and iii) connective means to provide serial flow of the water from the pH adjusting region through to the last active medium.

In a fourth aspect, the present invention provides an apparatus for removing one or more cationic, anionic and/or non-ionic surfactants and optionally one or more organic, inorganic and/or biological contaminants from water, the apparatus comprising:

i) an inlet for a pH adjusted water;

ii) one or more of the following active media:
  a) a medium that has a negative charge in the pH adjusted water for removing cationic surfactants;
  b) a medium that has a positive charge in the pH adjusted water for removing anionic surfactants;
  c) a medium that has a high surface area, is porous, adsorbs hydrophobic uncharged material and/or adsorbs hydrophobic charged material in the pH adjusted water, for removing non ionic surfactants;

and optionally one or more of the following active media:
  d) one or more media for adsorbing organic contaminants from the water;
  e) one or more media for adsorbing inorganic contaminants from the water;
  f) one or more media for adsorbing biological contaminants from the water;

wherein one of the above active media is a first active medium having an inlet for the pH adjusted water and one of the above active media is a last active medium that has an outlet for the water; and iii) connective means to provide serial flow of the water from the first active medium through to the last active medium.

It will be understood that the last active medium will be selected from one of a)-c) or d)-f) such that if the last active medium is not one of a)-c) then the water will pass through one or more of a)-c) and optionally one or more of d)-f) prior to passing through the last active medium.

It will be appreciated that some variations to the order in which the active media are used are possible, depending on the characteristics required. In some cases there may also be advantages in duplicating some media. In other cases parallel flow may be of more practical value than series flow.

Preferably, the apparatus is used to treat contaminated water according to the method of the first aspect of the invention.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

General Information

At this point it is worth noting that colloidal media acquire a surface charge when immersed in a high dielectric constant medium (D=80) either by ionisation of surface groups or by specific adsorption of species from solution (ions, solutes). Ions of opposite charge ("counter-ions") are drawn towards the charged surface, whereas, ions of similar charge to the surface ("co-ions") are displaced, forming a diffuse layer of charge. The smearing out of charge maintains overall electroneutrality. When two charged surfaces approach one another in solution, the two diffuse electrical double layers overlap causing the ion densities to shift from their equilibrium value resulting in either a repulsive or attractive force between the two surfaces. If the two surfaces are of similar sign then the resultant interaction would be repulsive whereas if the two surfaces were of opposite sign then we would expect the resultant force to be attractive.

Biological species (viruses, bacteria, protozoa etc), surfactants, organic and inorganic contaminants bind to active surface groups of an external media based on the specific chemical interactions, electrostatics (charge), hydrophobicity, roughness, specific interaction (lock-key mechanism eg antibody-antigen, enzymic) or due to the crystal chemistry structure and coordination.

Given that biological organisms such as viruses and bacteria have colloidal dimensions they behave similarly to other colloidal particles in aqueous systems. Their microbial attraction and attachment can be explained simply in terms of physicochemical principles of adhesion and adsorption.

For this reason micro-organisms such as bacteria can be thought of as a "living colloid". Many pathogens possess active surface groups, such as carboxylate and phosphate groups associated with cellular glycoproteins, which are available, for example, by chemical or electrostatic means, when contacted with active surface groups of an external medium.

Close contact between surfaces may result in the formation of chemical bonds between surface sites and the approaching surfaces. This is called chemisorption and typically occurs between carboxylates and phosphates and a wide range of metal cations such as aluminium, calcium and iron in natural systems. The precise nature of these chemical interactions is often complex but may involve ligand bonding to carboxylate and phosphate groups on the surface of micro-organisms in addition to van der Waals forces generally to pull colloids together in a strong adhesive contact.

As used herein, the terms "adsorb" and "adsorption" may refer to either electrostatic adsorption or chemisorption.

Micro-organism adsorption is due to short-range attraction forces (hydrophobic, coulombic and van der Waals forces). Bacterial adhesion takes place through polymer bridging, this adhesion can be either non reversible (permanent) or temporary. Some microorganisms bind to many types of surfaces (non-specific adhesion), the strength and extent of this type of adhesion may be related to the surface properties of the substrate. Whereas, specific adhesion involves interactions between complementary molecular configurations between the micro-organism and substrate surface.

The term "surfactant" or "surface active agent" refers to surface active molecules that absorb at the air/water and oil/water interfaces, substantially reducing their surface energy. The term detergent is often used interchangeably with surfactant. Surfactants are classified depending on the charge of the surface active moiety into cationic, anionic, nonionic and amphoteric surfactants.

Surfactants are amphiphilic in nature having both hydrophilic (water loving, lipophobic, oleophobic) and hydrophobic (water hating, lipophilic, oleophilic) moieties. The hydrophobic part of the molecule is non-polar, consisting of aliphatic or aromatic hydrocarbon residues. The hydrophilic part consists of polar groups which can interact strongly with water, hydroxyl, carboxyl and ionic groups. Because of their dual nature they are able to form unique surfactant structures (ie micelles, vesicles) in solution to eliminate contact between their hydrophobic moieties and the aqueous environment. Thus providing essentially a hydrophobic core to which greases, oils, hydrocarbons can dissolve. The formation of unique surfactant structures (ie micelle, vesicles etc) in solution forms the basis of detergency, the formation of surfactant aggregates allows oil-soluble contaminants, greases, oils and hydrocarbons to dissolve within ('solubilisation' which is important in detergency), essentially a hydrocarbon core ('like dissolves like') whereas hydrophilic contaminants (dirt, clays etc) present whilst they remain in the aqueous environment are stabilised by the adsorption of surfactant.

The orientation, conformation and density of surfactant adsorption is dependent on the nature of the surfactant (ie anionic, cationic, non-ionic), the specific surface chemistry, charge and the hydrophobicity/hydrophilicity (contact angle) of the surface adsorbent. Charged surfactant (anionic, cationic) monomers adsorb onto oppositely charged hydrophilic surface sites from aqueous solution due to an electrostatic attraction between the charged head groups and the surface sites.

It will be understood that "soap" is one example of the broader class of surfactant. Typically, the term "soap" refers to sodium or potassium salts of long chain fatty acids. Soaps represent most of the commercial carboxylates and are classified as anionic surfactants. Soaps are often ineffective in "hard" waters, reacting with minerals in the hard water to form substances that do not dissolve.

The present inventors have surprisingly found that one or more surfactants and optionally one or more inorganic, organic and/or biological contaminants are able to be selectively removed from contaminated water using specific active media, provided the contaminated water first contacts a pH adjusting agent/medium that is able to adjust the pH of the contaminated water prior to contact with the active media.

Without being bound by theory, the present inventors believe that the pH adjusting agent/medium functions by destabilizing the surfactants (anionic, cationic and/or non-ionic) in the water. The inventors believe that a change in the pH of the contaminated water interferes with the buffering of the surfactant thereby destabilizing the surfactants and allowing the selective removal of one or more of the non-ionic, cationic and/or anionic surfactants from the water by specific active media suitably charged by the pH adjusted water. Further, the inventors propose that the removal of surfactants by the active adsorption filtration method and apparatus of the present invention destabilises the normally surfactant-stabilised contaminants present in the water. Thus, the present inventors believe that the pH adjusting agent/medium and subsequent consecutive series of active media allow both destabilisation and removal of surfactants which results in destabilisation of the normally surfactant stabilised contaminants, thereby allowing the destabilised contaminants to be subsequently adsorbed to selective media and be removed.

Water suitable for treatment in the method and apparatus of the present invention include but are not limited to rivers, dams, ground water, seawater, swimming pools and industrial and domestic waste water (including "grey water"). These waters may contain natural and/or synthetic surfactants which allow the other contaminants present in the water to remain stable and therefore are more difficult to remove. The method and apparatus of the invention provides a practical way of removing a range of such surfactants and optionally other contaminants from such water. The inventors believe that by removing surfactants by active adsorption filtration to selective media, it is possible to destabilise contaminants that are normally stabilised in solution by the surfactants and selectively remove them from the water.

It will be appreciated that depending on the final level of biological contamination and intended use, the water may require further purification. Accordingly, the method and apparatus of the present invention may include a disinfection step and medium respectively to further reduce the level of biological contamination. Known disinfection methods including but not limited to chlorination, chlorine oxide, ozonolysis and UV irradiation may be employed in the present invention.

Preferably, the method and apparatus of the invention include a chlorination step/chlorination agent. The contaminated water may be chlorinated before and/or after it has contacted the active media of the invention. For instance, the contaminated water may be chlorinated prior to being filtered and/or after contact with one or more of the active adsorption media. It will be appreciated that standard chlorination procedures may be followed. Chlorination may, for example, be achieved using a standard liquid sodium hypochlorite (NaOCl) solution in a concentration of about 10-20 ppm.

The contaminated water may be filtered before or after treatment with the pH adjusting agent/medium. Accordingly, in the apparatus of the invention, the contaminated water may pass through a filter before or after it enters the pH adjusting region to contact the pH adjusting agent/medium. Preferably, the contaminated water is filtered before treatment with the pH adjusting agent/medium. Suitable filters include but are not limited to a stainless steel mesh filters, hair and lint filters, sand filters, steel sinters, bag filters, pleated filters. Preferably, the filters are back-washable.

The contaminated water may also undergo a particulate matter removal step in which particulate matter is removed from the water before or after or at the same time as treatment with the pH adjusting agent/medium. Accordingly, in the apparatus of the invention, the contaminated water may pass through a region of apparatus where particulate material is removed from the water before or after it enters the pH adjusting region to contact the pH adjusting agent/medium or while it is in the pH adjusting region and in contact with the pH adjusting agent/medium. Preferably the particulate matter is removed from the water after treatment with the pH adjusting agent/medium. More preferably, the particulate matter is removed from the water before it is contacted with one or more of the active adsorption media of the invention. By way of example only, particulate matter may be removed by use of sediment filters, Ballotini glass filters (e.g. ~0.1-5 mm), centrifugal drum filters and flocculation followed by filtration/separation. Preferably, the filters are back-washable. The removal of particulate matter is particularly preferred in the treatment of "grey water", where there is generally a high level of surfactant stabilised particulate matter (>0.5 microns) which is largely responsible for its colour and turbidity.

The present inventors have found that the purification of contaminated water may be enhanced by the addition of flocculants followed by settling and filtration or separation of the flocs. Examples of suitable flocculants include but are not limited to alum, ferric chloride or polymer flocculants. As explained in greater detail below, some flocculants, such as alum and ferric chloride, have the added effect of adjusting the pH of the contaminated water to provide the "pH adjusted water" required for the method and apparatus of the present invention.

In some cases flocculation may be improved by the addition of fine particles of the solid form of the flocculant, e.g. fine particles of alumina may be used to "seed" the flocculation of alum.

The method and apparatus according to the present invention may further include a step and medium respectively to treat hard water. More specifically, the contaminated water may be contacted with an ion exchange medium that allows the removal and replacement of hard ions such as calcium, magnesium and/or iron with ions, such as $Na^+$, known to make water soft. Preferably, the ion exchange medium is a $Na^+$ ion exchange resin, to allow hard ions to be exchanged for $Na^+$. This step may be carried out at any stage in the purification process. Preferably, the incorporation of an ion exchange step and medium for the purpose of softening water occurs as the final step/medium in the method and apparatus aspects of the present invention.

It will be appreciated that some of the media employed in the method and apparatus of the invention may remove more than one type of contaminant. This will be evident from the below description.

In the present invention, a pH adjusting agent/medium is used to adjust the pH of the 30 contaminated water prior to it contacting various specific media selected to remove the surfactants and optionally other contaminants. Throughout the specification, it will be understood that reference to the phrase "pH adjusted water" refers to contaminated water that has contacted an agent or medium as described in step a) in the method and i) in the apparatus aspects of the present invention. Any pH adjusting agent/medium that has the effect of altering the pH of the contaminated water may be used in the present invention. The pH adjusting agent/medium influences the sign of the charge and the magnitude of the charge on the subsequent media since the various media contain surface acid groups whose degree of ionisation is determined by solution pH. When the untreated water is treated with or passed through the pH adjusting agent/medium, the pH of the water adjusts accordingly and in doing so, causes the following media bathed in the adjusted fluid to acquire a surface charge either by the ionisation of the surface groups or by specific ion adsorption thus presenting a surface suitable for selective adsorption of the contaminants.

The "pH adjusting region" referred to in the apparatus according to the third aspect of the invention will be understood to be any region, area or part of the apparatus in which the water is brought into contact with the pH adjusting agent/medium. By way of example only, the region, area or part of the apparatus may be a tank, pipe or cartridge in which the water is temporarily held or through which the water passes. The water may, for instance, be dosed with a pH adjusting agent in a tank or pipe, e.g. by way of in-line pipe injection, or alternatively brought in contact with a pH adjusting medium such as an ion exchange medium in a cartridge.

According to the invention, the "pH adjusting agent/medium" may be one or more acids, one or more hydrolysable salts, an ion exchange medium or a combination thereof.

Suitable acids that are able to adjust the pH of the contaminated water include but are not limited to organic and inorganic acids. Preferably the acid is an inorganic acid, such as hydrochloric acid. Preferably, the acid adjusts the pH of the water to 5-7.

Suitable hydrolysable salts that are able to adjust the pH of the contaminated water include but are not limited to alum in its various forms and ferric chloride. Preferably, the hydrolysable salt is alum in the form of $Al_2(SO_4)_3$ or $KAl(SO_4)_2 \cdot 12H_2O$. It will be appreciated that the hydrolysable salt will be used at weight concentrations comparable with the total solids content of the grey water.

It will be appreciated that some hydrolysable salts have dual functionality and are able to adjust the pH of the contaminated water and act as a flocculant. As noted above, the present inventors have found that the use of some flocculants, such as alum and ferric chloride in a particulate matter removal step is an effective way of removing particulate contaminants and adjusting the pH of the contaminated water, particularly grey water.

Suitable ion exchange mediums that are able to adjust the pH of the contaminated water include acidic cation ion exchange mediums. Preferably the ion exchange mediums are ion exchange resins, more preferably an acidic cation ion exchange resin. It will be appreciated that any commercially available acidic cation ion exchange resins may be used in the present invention.

Preferably, suitable acidic cation ion exchange resins that are able to adjust the pH of the contaminated water are used in the present invention. In one embodiment directed to a method of removing contaminants from grey water and the corresponding apparatus, a strong cationic $H^+$ ion exchange resin is preferably used. In that embodiment, the strong cationic $H^+$ exchange medium adjusts the pH of the contaminated water, having a pH in the range of about 7-10, and adjusts this down to a range of about 5-7.

Preferably, the ion exchange medium is packaged into cartridges which may be gravity or pressure fed with the contaminated water.

Depending on the application, generally, the particle size of the ion exchange resin will preferably be in about the mm size range.

For the majority of applications, the contact time between the ion exchange medium and the water will be minimal. Typically, contact times of less than a minute will be sufficient to adjust the pH of the contaminated water. The contact time, is, however, dependent on a variety of factors applicable to each use situation, such as cartridge size, resin size and flow-rate. The person skilled in the art will appreciate that that a suitable contact time may be established through appropriate testing and evaluation.

It will be appreciated that in addition to adjusting the pH of the contaminated water, the ion exchange medium may also remove specific contaminants from the water. For instance, when the pH adjusting medium is an ion exchange medium, biological contaminants may be removed by way of adsorption onto the medium in accordance with what is presently known in the art. Biological contaminants including but not limited to *Cryptosporidium, Giardia, Cholera, E coli*, bacteria, viruses, algae and yeast may be removed by an appropriate ion exchange medium in accordance with known methods.

In the case of household grey water, it will be appreciated that the pH of the contaminated water to be purified will depend on the activities of each household. It is envisaged that alum, ferric chloride or an acidic cation exchange medium would be suitable choices for most households producing grey water.

It will be appreciated that the selection of type, combination, order, particle size and surface chemistry of the different active adsorption media used in the present invention allows for the selective and specific removal of various surfactants, organic, inorganic and biological contaminants. The present inventors believe that the nature of the substrate media (ie its hydrophobicity/hydrophilicity, charge density and the nature of the surface groups) dictates the mechanism involved in the adsorption process (ie hydrophobic or electrostatic).

It will be appreciated that the charge of the active adsorption media required to remove cationic, anionic and nonionic surfactants will depend upon the pH adjusting agent/medium used in step a) of the method and i) of the apparatus aspects of the invention and the pH of the water once it has been in contact with the pH adjusting agent/medium. For instance, silica is negatively charged at pH>2 and will remove cation contaminants such as cationic surfactants from the water, while alumina is positively charged at pH<8 and will remove anionic contaminants such as anionic surfactants from water, whereas the neutral/hydrophobic contaminants (eg colour and nonionic surfactants) will be removed by media such as activated charcoal.

Any medium that acquires a negative charge in the pH adjusted water may be used in step b) of the method and ii) a) of the apparatus aspects of the present invention. The negatively charged or anionic medium removes cationic contaminants from the water. Examples of cationic contaminates that may be removed from contaminated water according to the method and apparatus of the present invention include but are not limited to cationic surfactants such as those found in detergents and cleaning agents. Preferred anionic media include but are not limited to silica in various forms, such as, a Ballotini medium, glass or silica powder. Silica may be presented in a number of physical forms such as powders, spheres or a spiral wound filter of silica fibres. The inventors have found that silica in the form of Ballotini glass spheres, preferably with a diameter in the range of approximately 0.1-5 mm, are ideal for the removal of coarse contaminants and can be readily back-washed, regenerating original flow-rates.

Any medium that acquires a positive charge in the pH adjusted water may be used in step c) of the method and ii) b) of the apparatus aspects of the present invention. The positively charged or cationic medium removes anionic contaminants from the water. Examples of anionic contaminates that may be removed from contaminated water according to the method of the present invention include but are not limited to anionic surfactants such as such as those found in detergents and cleaning agents. Preferred cationic media include but are not limited to alumina in various forms, e.g. alox. Alumina may be presented in a number of physical forms such as powders, granules, crystalline solids, compressed discs or wafers, or a spiral wound filter of alumina fibres. Preferably, the alumina is in a fully hydrated state. In a preferred embodiment, the cationic medium is hydrated alumina, in powdered form of about 1 mm particle size.

Any medium that has a high surface area, is porous, adsorbs hydrophobic uncharged material and/or adsorbs hydrophobic charged material in the pH adjusted water may be used as the medium in step d) of the method and ii) c) of the apparatus aspects of the invention. It will be appreciated that this medium may possess one or more of the above properties. Throughout the specification, this medium may be referred to as the "high surface area/porous/hydrophobic medium". The high surface area/porous/hydrophobic medium removes neutral and/or hydrophobic contaminants from the water. Examples of neutral or hydrophobic contaminants that may be removed from contaminated water according to the method of the present invention include but are not limited to non-ionic surfactants such as those found in detergents and cleaning agents. Preferred media that may be used in step d) of the method and ii) c) of the apparatus include but are not limited to activated charcoal, graphite and anthracite. The preferred high surface area/porous/hydrophobic media is activated charcoal. The activated charcoal may be in the form of powder, pellets or a spiral wound filter. Preferably, the activated charcoal is in the form of powder having a size in the range of about 1-3 mm. Even more preferably, the activated charcoal is impregnated with silver.

It will be understood that the term "high surface area" medium defines a medium that has a surface area in the range of about 50-100 $m^2/g$.

It will be understood that the term "porous" medium defines a medium that contains submicron sized pores.

The anionic, cationic and high surface area/porous/hydrophobic active adsorption media may be fed under gravity or under pressure, depending on the required flow-rate and level of contaminants in the feed water. Preferably, the active adsorption media are utilised in the form of beds of the active media e.g. a mixed bed active adsorption bed filter. The active adsorption filtration media could also be used in the form of a single or two component mixed-powder bed system. The beds of active media may be contained within commercially available filtration cartridges.

Depending on the application, generally, the particle size of the anionic, cationic and high surface area/porous/hydrophobic media will be in the order of about 60 µm to 10 mm, preferably about 0.1 mm to 5 mm. Preferably, each media has the potential for back-washing.

For the majority of applications, the contact time between the anionic, cationic and high surface area/porous/hydrophobic media and the water will be minimal. Typically contact times of less than about a minute will be sufficient to adjust the pH of the contaminated water. The person skilled in the art will appreciate that a suitable contact time may be established through appropriate testing and evaluation.

It will be appreciated that laboratory bench and pilot plant testing may be carried out to establish the optimum relationship between the thickness of the beds of each active media and the particle size to ensure maximum removal of the relevant contaminant whilst maintaining high water throughputs.

In addition to removing one or more surfactants from contaminated water, the method and apparatus according to the present invention may also remove one or more organic, inorganic and/or biological contaminants. The pH adjusted water may be contacted with one or more of the media described in e)-g) in the first aspect and ii) d)-f) of the third and fourth aspects of the invention before or after it has contacted one or more of the media in b)-d) of the first aspect and ii) a)-c) of the third and fourth aspects of the invention. Preferably, the pH adjusted water is contacted with one or more of the media described in e)-g) in the first aspect and ii) d)-f) of the third and fourth aspects of the invention after it has contacted one or more of the media in b)-d) of the first aspect and ii) a)-c) of the third and fourth aspects of the invention.

Examples of organic contaminates that may be removed from contaminated water according to the method and apparatus of the present invention include but are not limited to proteins; enzymes; humic substances, nitrogenous compounds and pesticides.

Examples of inorganic contaminates that may be removed from contaminated water according to the method and apparatus of the present invention include sulphates, nitrates and phosphates and multi-valent metal cations.

Examples of biological contaminants that may be removed from contaminated water according to the method and apparatus of the present invention include but are not limited to viruses, bacteria, algae, yeast, protozoa, enzymes.

It will be appreciated that any medium known to remove organic, inorganic and/or biological contaminants from water may be used in the method and apparatus of the present invention. It will also be appreciated that one or more of the media used in steps b)-d) of the method and ii) a)-c) of the apparatus may be multi-functional, in that as well as removing one or more cationic, anionic and neutral/hydrophobic contaminants, they may also remove one or more organic, inorganic and/or biological contaminants.

In the present invention the inventors believe that introducing bacteria known to break down surfactants by using them as food and energy for their growth and retaining them within the media will allow biodegradation of surfactants, thus regenerating the media for further surfactant adsorption. Subsequent action by bacteria will result in further decomposition of surfactants into carbon dioxide, water and mineral salts which are not contaminants. Thus in a preferred embodiment, each medium in the method and apparatus of the invention includes bacteria for the function of regenerating each medium that has removed surfactants from the water.

The active media used in the method and apparatus of the invention may be, alternatively or additionally, regenerated by subsequent treatment using known methods. For instance, zeolite may be washed in a sodium chloride solution, ion exchange resins ($H^+$) may be washed with acid or peracetic acid solutions, activated charcoal (carbon) and alumina may be roasted at high temperatures to burn off the adsorbed contaminates, alumina may additionally be treated with acid/base according to known methods. Some active media may additionally or alternatively be regenerated by backflushing.

The apparatus containing the active media may exist as a standard unit which contains a pH adjusting medium or a pH adjusting region for contacting water with a pH adjusting agent and specific anionic, cationic and/or high surface area/porous/hydrophobic media and optionally one or more media for removing inorganic, organic and/or biological contaminants. Alternatively, the water may be pH adjusted remote from a standard unit that contains only the specific anionic, cationic and/or high surface area/porous/hydrophobic media and optionally one or more media for removing inorganic, organic and/or biological contaminants, such that the pH adjusted water enters the unit via an inlet.

The method and apparatus of the present application, may further include holding tanks for storing the water prior to and during the treatment process, such as surge sump tanks; settling tanks for separation of flocs; and re-use tanks for storage of water that has been decontaminated according to the invention.

In one embodiment of the method and apparatus according to the present invention, the anionic surfactant is a class of soap known as carboxylates. The present inventors believe that in addition to destabilisation by the pH adjusting agent/medium, such anionic surfactants may be additionally destabilised in the presence of calcium or magnesium. The inventors have found that the presence of calcium ions aids the removal of carboxylate from the contaminated water in the form of calcium carboxylate. The inventors found that contacting water containing a carboxylate contaminant with zeolite contaminated with calcium ions, aided the removal of carboxylate from the water when it was subsequently contacted with alumina. Preferably, calcium ions are present in one or more of the active media or added to the contaminated water. For example, the calcium ions may be incorporated in the resin bed of the media that removes anionic surfactants. Alternatively, the water may come in contact with calcium ions prior to contacting the carboxylate removing medium.

In one embodiment of the first aspect, the present invention is directed to a method of removing one or more surfactants and one or more surfactant stabilised contaminants from water, the method comprising:

a) contacting the water with a cationic ($H^+$) ion exchange resin for a time sufficient to provide a pH adjusted water having a pH in the range of about 3-7, followed by contacting the pH adjusted water with one or more of the following active adsorption media:

b) an anionic silica for a time and under conditions such that a proportion of cationic surfactants present in the water are adsorbed onto said medium and removed from the water;

c) a cationic alumina medium for a time and under conditions such that a proportion of anionic surfactants present in the water are adsorbed onto said medium and removed from the water;

d) a high surface area/porous/hydrophobic activated charcoal medium for a time and under conditions such that a proportion of non ionic surfactants present in the water are adsorbed onto said medium and removed from the water; and optionally contacting the pH adjusted water with e) a zeolite medium for removing inorganic contaminants, the pH adjusted water contacting the medium for a time sufficient and under conditions such that a proportion of inorganic contaminants are adsorbed onto said medium and removed from the water.

In another embodiment of the first aspect, the present invention is directed to a method of removing one or more surfactants and one or more surfactant stabilised contaminants from water, the method comprising:

a) dosing the water with an acid for a time sufficient to provide a pH adjusted water having a pH in the range of about 3-7, followed by contacting the pH adjusted water with one or more of the following active adsorption media:

b) an anionic silica for a time and under conditions such that a proportion of cationic surfactants present in the water are adsorbed onto said medium and removed from the water;

c) a cationic alumina medium for a time and under conditions such that a proportion of anionic surfactants present in the water are adsorbed onto said medium and removed from the water;

d) a high surface area/porous/hydrophobic activated charcoal medium for a time and under conditions such that a proportion of non ionic surfactants present in the water are adsorbed onto said medium and removed from the water; optionally contacting the pH adjusted water with e) zeolite medium, for removing inorganic contaminants, the pH adjusted water contacting the medium for a time sufficient and under conditions such that a proportion of inorganic contaminants are adsorbed onto said medium and removed from the water.

Preferably, the activated charcoal, silica and alumina also remove a proportion of the biological contaminants present in the water.

Preferably, the activated charcoal also removes a proportion of the organic contaminants present in the water.

In another embodiment according to the first aspect of the invention, there is provided a method of treating domestic grey water comprising the following steps:

i) passing the grey water through a filter, preferably a fine steel mesh or a steel sinter of pore size in the range of approximately 10-100 μm;

ii) passing the grey water through a sediment filter;

iii) providing a pH adjusted water by contacting the grey water with a strong cation ($H^+$) ion exchange resin or dosing the grey water with aluminium sulfate for a time or in an amount sufficient to provide a pH adjusted water having a pH in the range of about 3-7;

wherein steps i)-iii) may take place in any order;

followed by contacting the pH adjusted water with the following media:

iv) silica for a time sufficient to remove a proportion of the cationic surfactants present in the water;

v) clinoptilolite zeolite for a time sufficient to remove a proportion of ammonia and inorganic contaminants;

vi) activated carbon impregnated with silver for a time sufficient to remove a proportion of non-ionic surfactants, organic and microbial contaminants, colour and odour;

vii) hydrated aluminium oxide for a time sufficient to remove a proportion of anionic surfactants and biological contaminants.

In another embodiment according to the first aspect of the invention, there is provided a method of treating domestic grey water comprising the following steps:

i) passing the grey water through a filter, preferably a fine steel mesh;

ii) providing a pH adjusted water by contacting the grey water with a strong cation ($H^+$) ion exchange resin or dosing the grey water with aluminium sulfate for a time sufficient or in an amount sufficient to provide a pH adjusted water having a pH in the range of about 3-7;

followed by contacting the pH adjusted water with the following media iii) silica for a time sufficient to remove a proportion of the cationic surfactants present in the water; followed by iv) activated carbon for a time sufficient to remove a proportion of non-ionic surfactants, organic and microbial contaminants, colour and odour; followed by v) hydrated aluminium oxide for a time sufficient to remove a proportion of anionic surfactants and biological contaminants; followed by vi) clinoptilolite zeolite for a time sufficient to remove a proportion of ammonia and inorganic contaminants.

In another embodiment according to the first aspect of the invention, there is provided a method of treating domestic grey water comprising the following steps:

i) passing the grey water through a filter, preferably a steel mesh filter;

ii) contacting the water with silica for a time sufficient to remove a proportion of the cationic surfactants present in the water;

iii) followed by providing a pH adjusted water by contacting the grey water with an acidic cation ($H^+$) ion exchange resin or dosing the grey water with aluminium sulfate for a time or in an amount sufficient to provide a pH adjusted water having a pH in the range of about 3-7;

followed by contacting the pH adjusted water with the following media iv) activated charcoal for a time sufficient to remove a proportion of non-ionic surfactants, organic and microbial contaminants, colour and odour; followed by v) clinoptilolite zeolite for a time sufficient to remove a proportion of ammonia and inorganic contaminants; followed by vi) hydrated aluminium oxide for a time sufficient to remove a proportion of anionic surfactants and biological contaminants.

In yet another embodiment according to the first aspect of the invention, there is provided a method of treating domestic grey water comprising the following steps:

i) passing the grey water through a filter, preferably a hair and lint filter, ii) dosing the grey water with aluminium sulfate, preferably at a rate of 1 g/L, in an amount sufficient to provide a pH adjusted water having a pH in the range of about 3-7;

followed by contacting the pH adjusted water with the following media:

iii) a silica filter, preferably a Ballotini filter, for a time sufficient to remove a proportion of the cationic surfactants present in the water;

iv) an activated carbon medium impregnated with silver for a time sufficient to remove a proportion of non-ionic surfactants, organic and microbial contaminants, colour and odour;

v) a zeolite medium for a time sufficient to remove a proportion of ammonia and inorganic contaminants;

vi) a hydrated aluminium oxide medium for a time sufficient to remove a proportion of anionic surfactants and biological contaminants.

The above methods are examples of different combinations of media that are suitable for treating domestic grey water to a standard suitable for garden irrigation and reuse in toilets.

In one embodiment of the third aspect, the present invention provides an apparatus for removing one or more cationic, anionic and/or nonionic surfactants and optionally one or more organic, inorganic and/or biological contaminants from water, the apparatus comprising:

a) a pH adjusting region in the form of a tank, pipe or cartridge wherein water in the tank, pipe or cartridge contacts a pH adjusting agent/medium to form a pH adjusted water having a pH in the range of about 3-7;

b) a silica containing cartridge having an inlet and an outlet, such that the pH adjusted water enters the cartridge via the inlet and upon contact of the water with the silica, a proportion of cationic contaminants present in the water are adsorbed onto said medium and removed from the water;

c) a zeolite containing cartridge having an inlet and outlet, such that the pH adjusted water enters the cartridge via the inlet and upon contact of the water with the zeolite a proportion of inorganic contaminants and ammonia present in the water are adsorbed onto said medium and removed from the water;

d) an activated carbon containing cartridge having an inlet and an outlet such that the pH adjusted water enters the cartridge via the inlet and upon contact of the water with the activated carbon, a proportion of non-ionic, organic and microbial contaminants present in the water are adsorbed onto said medium and removed from the water;

e) an aluminium oxide containing cartridge having an inlet and an outlet such that the pH adjusted water enters the cartridge via the inlet and upon contact of the water with the aluminium oxide, a proportion of anionic and biological contaminants present in the water are adsorbed onto said medium and removed from the water; and f) connective means to provide serial flow of the water from the silica containing cartridge through to the aluminium oxide containing cartridge.

In another embodiment of the third aspect, the present invention provides an apparatus for removing one or more cationic, anionic and/or nonionic surfactants and optionally one or more organic, inorganic and/or biological contaminants from water, the apparatus comprising:

a) a pH adjusting region in the form of a tank or pipe, wherein water in the tank or pipe contacts aluminium sulfate to form a pH adjusted water having a pH in the range of about 3-7;

b) a Ballotini glass filter having an inlet and an outlet such that upon contact of the pH adjusted water with the Ballotini glass, a proportion of cationic contaminants present in the water are removed from the water; followed by c) an activated carbon containing cartridge having an inlet and an outlet such that the pH adjusted water enters the cartridge via the inlet and upon contact of the water with the activated carbon, a proportion of non-ionic, organic and microbial contaminants present in the water are adsorbed onto said medium and removed from the water, followed by d) a zeolite containing cartridge having an inlet and outlet, such that the pH adjusted water enters the cartridge via the inlet and upon contact of the water with the zeolite a proportion of inorganic contaminants and ammonia present in the water are adsorbed onto said medium and removed from the water; followed by e) an aluminium oxide containing cartridge having an inlet and an outlet such that the pH adjusted water enters the cartridge via the inlet and upon contact of the water with the aluminium oxide, a proportion of anionic and biological contaminants present in the water are adsorbed onto said medium and removed from the water; and f) connective means to provide serial flow of the water from the Ballotini glass filter through to the aluminium oxide containing cartridge.

In another embodiment of the third aspect, the present invention provides an apparatus for treating contaminated water, the apparatus comprising the following series of active media:

a) a first cartridge having an inlet and an outlet and containing an cationic ($H^+$) ion exchange medium, such that water enters the first cartridge via the inlet and contacts the ion exchange medium to form a pH adjusted water having a pH in the range of about 3-7, the outlet of the first cartridge being connected to:

b) a second cartridge having an inlet and an outlet and containing silica, such that the water enters the cartridge via the inlet and upon contact of the water with the silica, a proportion of cationic contaminants present in the water are adsorbed onto said medium and removed from the water; the outlet being connected to c);

c) a third cartridge having an inlet and outlet and containing a zeolite medium for removing inorganic contaminants and ammonia, the outlet being connected to d);

d) a fourth cartridge having an inlet and an outlet and containing activated charcoal such that the water enters the cartridge via an inlet and upon contact of the water with the activated carbon, a proportion of non-ionic, organic and microbial contaminants present in the water are adsorbed onto said medium and removed from the water, the outlet being connected to e);

e) a fifth cartridge having an inlet and an outlet and containing a aluminium oxide that has a positive charge in the pH adjusted water, such that the water enters the cartridge via an inlet and upon contact of the water with the aluminium oxide, a proportion of anionic and biological contaminants present in the water are adsorbed onto said medium and removed from the water.

The apparatus may further comprise a filter for the removal of course matter, preferably, a 5 μm filter (e.g. a mesh or sinter) and a filter for the removal of sediment (e.g a sedimentation filter). The unit (e.g. cartridge) containing the filter has an inlet and outlet.

In a preferred embodiment of the third aspect, the present invention provides an apparatus for removing one or more cationic, anionic and/or nonionic surfactants and optionally one or more organic, inorganic and/or biological contaminants from water, the apparatus comprising:

a) a course filter, preferably a hair and lint filter, for filtering the water; connected to b) a holding tank for holding the water, preferably a surge sump tank, connected to c) a settling tank;

d) a pH adjusting region, preferably a pipe or tank, between the holding tank and settling tank for adjusting the pH of the water with a pH adjusting agent, preferably aluminium sulfate;

wherein the settling tank is connected to e) a Ballotini filter; which is connected to f) a mixed bed active adsorption bed filter including an activated carbon medium, a zeolite medium and an alumina medium each medium being connected to one another via inlets and outlets, the mixed bed filter bed being connected to g) a re-use tank for storing water; and h) connective means to provide serial flow of the water from a) to g).

Preferably, the pH adjusting agent is stored in a chemical storage tank and is introduced into the pH adjusting region, preferably by way of in-line pipe injection.

Preferably, purification of the contaminated water takes place in batches, preferably to the capacity of the settling tank. More preferably, the apparatus according to a preferred embodiment of the invention is self-cleaning, preferably periodically after purification of a batch of contaminated water has been completed.

The apparatus and method of the present invention may be utilised in a domestic or industrial environment. When used in a domestic environment, grey water from the bathroom, kitchen and/or laundry may be treated in the apparatus according to the invention. The process of the present invention may be applied to shower, sink, bath or laundry water or any combination of these. Preferably, grey water is piped to a surge tank, and then pumped through the active adsorption filtration apparatus of the present invention. Depending on the intended use of the water, the water may need to be further treated, such as by way of chlorination, so as to be of sufficient quality to meet the required standards. Accordingly, the apparatus of the present invention may further comprise a unit, preferably a slow release cartridge for carrying out further purification, such as chlorination. Alternatively, slow release chlorine tablets may be added to the water at any stage in the process, preferably after the water held has been acidified. The treated water may then be fed directly into a reservoir ready for reuse. The treated water may for instance be pumped to the garden for surface irrigation or fed back to the toilet cistern. The reservoir containing the treated water may be supplemented by mains top up and/or rain water.

Some preferred embodiments of the present invention will now be described by way of example only.

BRIEF DESCRIPTION OF THE DRAWINGS

FIG. 5 (b) shows an enlargement of the locker containing the Ballotini filter, active adsorption filter beds and chemical storage tank in FIG. 5(a).

MODES FOR CARRYING OUT THE INVENTION

Figure 1:
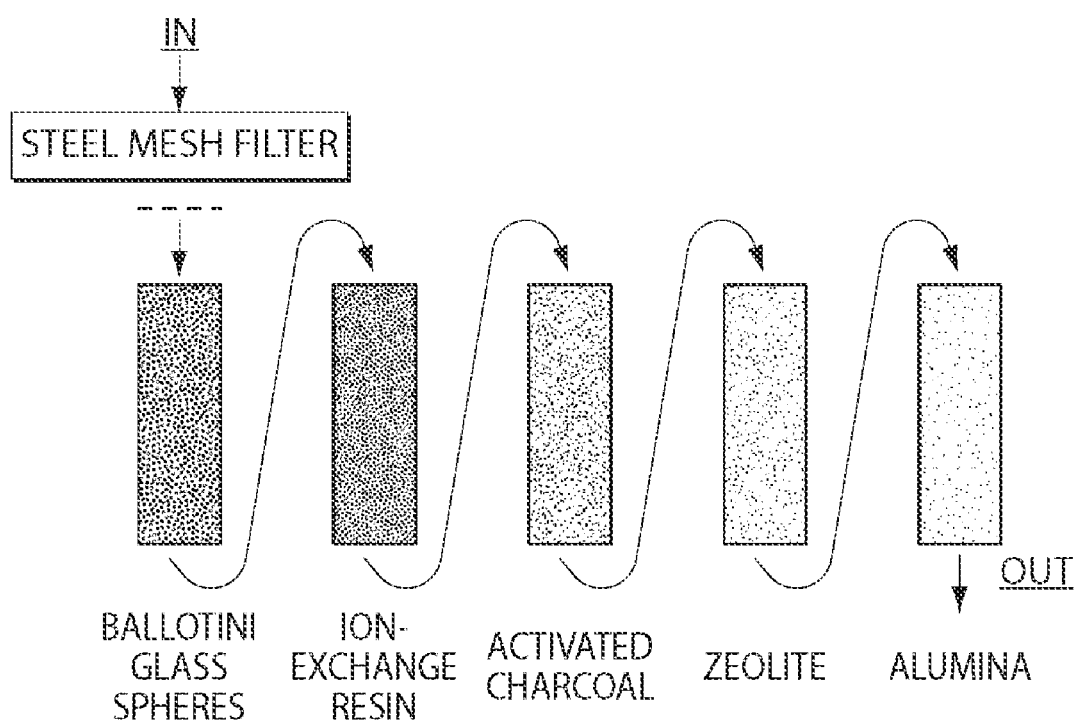
FIG. 1 shows a schematic of a laboratory scale apparatus of the invention being used for the treatment of commercial laundry grey water.

FIG. 1 shows a schematic of a typical active adsorption filter unit that may be used in the treatment of commercial laundry wastewater or household grey water. The active adsorption filter unit of the invention comprises a plurality of cartridges that each contain an active adsorption medium. The number of cartridges in the unit will depend on the degree of treatment required. It is envisaged that a standard active filtration unit consisting of six cartridges, each containing the following consecutive active media i) a pre-filter such as steel mesh, ii) a sediment filter, iii) a cation exchange resin, iv) ballotini, v) zeolite vi) activated carbon and vii) alumina, will be sufficient to treat the grey water produced from the average household.

FIG. 1 also demonstrates the consecutive nature of the treatment process.

Figure 2:
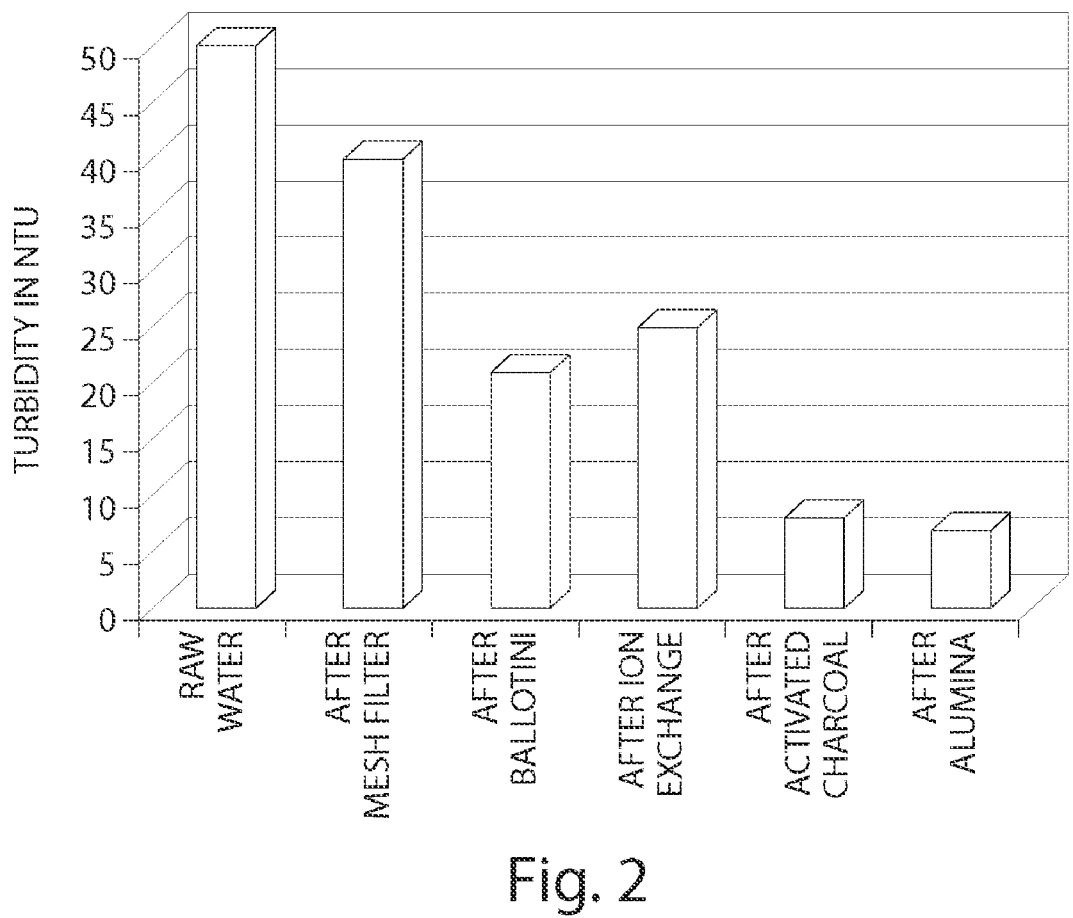
FIG. 2 shows some typical results obtained from the laboratory treatment process.

FIG. 2 shows typical results for the reduction in turbidity obtained with the laboratory system.

Figure 3:
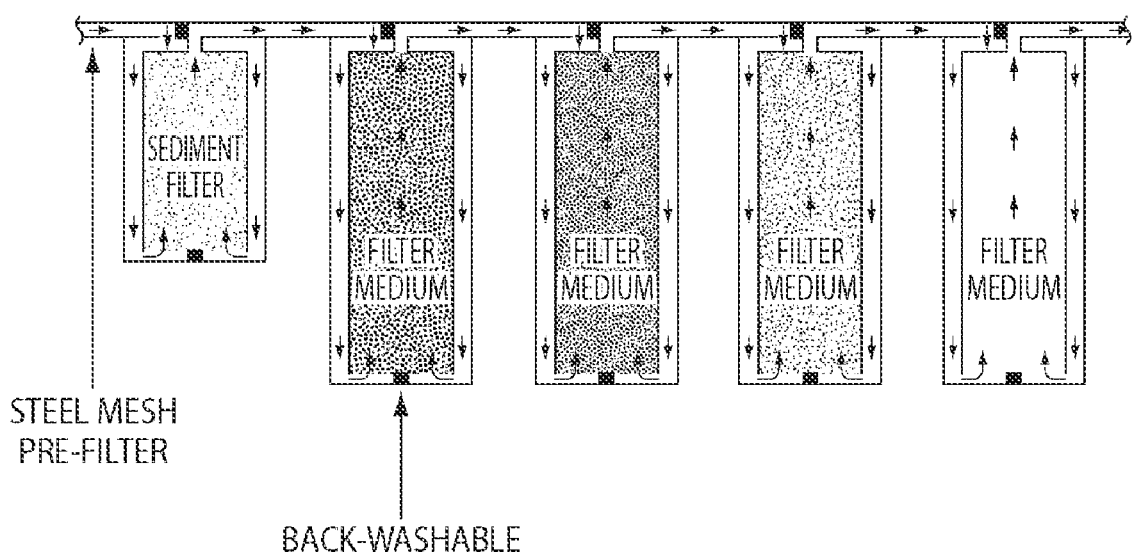
FIG. 3 shows a schematic of a pilot scale filtration system.

FIG. 3 shows a schematic of one embodiment of the apparatus of the present invention.

Figure 5A:
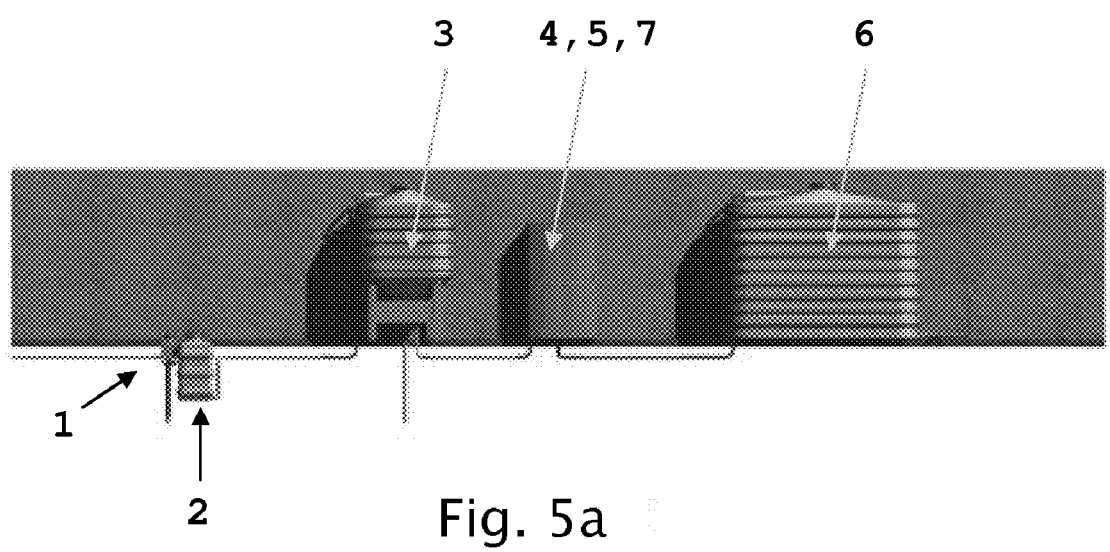
FIG. 5 (a) shows a preferred embodiment according to the third aspect of the invention.

FIGS. 5(a) and (b) show a schematic of another embodiment of the apparatus of the present invention.

Materials and Methods

EXAMPLE 1

The water used in the following Example was obtained from a commercial laundry. The basic properties of this grey water and some of the contaminants present in the water are listed below:

| Turbidity: | 50-100 NTU |
|---|---|
| Total solids: | 0.5 g/L |
| PH: | 7-10 |
| Conductivity: | 0.5 mS/cm |

We can estimate a typical $BOD_5$ level of around 100 mg/l and coliforms at $10^6$ per litre. In addition, we would expect bacteria, protozoa, viruses, anionic, cationic and non-ionic detergents, ammonia and some residual chlorine. There will also be some nitrates, sulphates and phosphates present.

The presence of surfactant in significant amounts in this sample is demonstrated by the extensive foaming of the sample on shaking.

The high turbidity value for the sample indicates that the water is not suitable for drinking or reuse in domestic situations. In comparison, it is worth noting that ultra pure distilled water has a turbidity value of about 0.02, drinking water has a turbidity value of 1-5 and reservoir water has a turbidity value of 5-10.

In this Example, the contaminated water was treated according to a preferred embodiment of the method and using a preferred embodiment of the apparatus of the present invention. In this respect, the water was filtered though a fine steel mesh filter followed by passing the water through glass chromatography columns containing the following active adsorption media: i) cationic ($H^+$) ion exchange resin (mm size beads), ii) silica in the form of glass Ballotini (0.1 mm particle size), iii) activated carbon (2-3 mm particle size), iv) aluminium oxide (0.1 mm particle size), v) clinoptilolite zeolite (2-3 mm size). The flow rates obtained with the laboratory system were typically 0.05-0.1 litre/min under very low hydrostatic pressure (of less than 0.03 bar) for a column of about 2.5 $cm^2$ cross sectional area and media depth of about 5-10 cm.

Analysis of the treated water to determine its basic properties and the level of certain contaminants was carried out. Some typical results are given below.

| Turbidity: | 5-10 NTU |
|---|---|
| Total solids: | 0.03 g/L |
| PH: | 6-7 |
| Conductivity: | 0.3 mS/cm |

In this example there was no chlorination of the water either before or after filtration and so we have not recorded BOD and coliform levels.

Foaming is an easy measure to determine whether or not surfactants are present in water. The present inventors found that the treated water in the above Example did not foam on shaking. This indicates that there has been a significant reduction in the level of surfactants in the treated water as compared to the untreated grey water. Further, it will be noted that the turbidity of the water has dropped to 5-10 and is now suitable for commercial reuse and for use in domestic situations.

FIG. 2, shows graphically the reduction in turbidity in the grey water of the above Example as it passes through each

EXAMPLE 2

Alum Flocculation

A household grey water sample had an initial turbidity of 140 NTU. This water was filtered through a screening mesh filter, which reduced the turbidity to 128. this water had a pH value of 8.8 and had a total dissolved contents of about 0.9 g/L. The turbidity results graphed below were obtained following addition of 0.9/L of aluminium sulphate flocculant (added as a concentrated, aqueous solution). The dense white floc structure precipitated from the solution was less than 10% of the solution volume.

Figure 4:
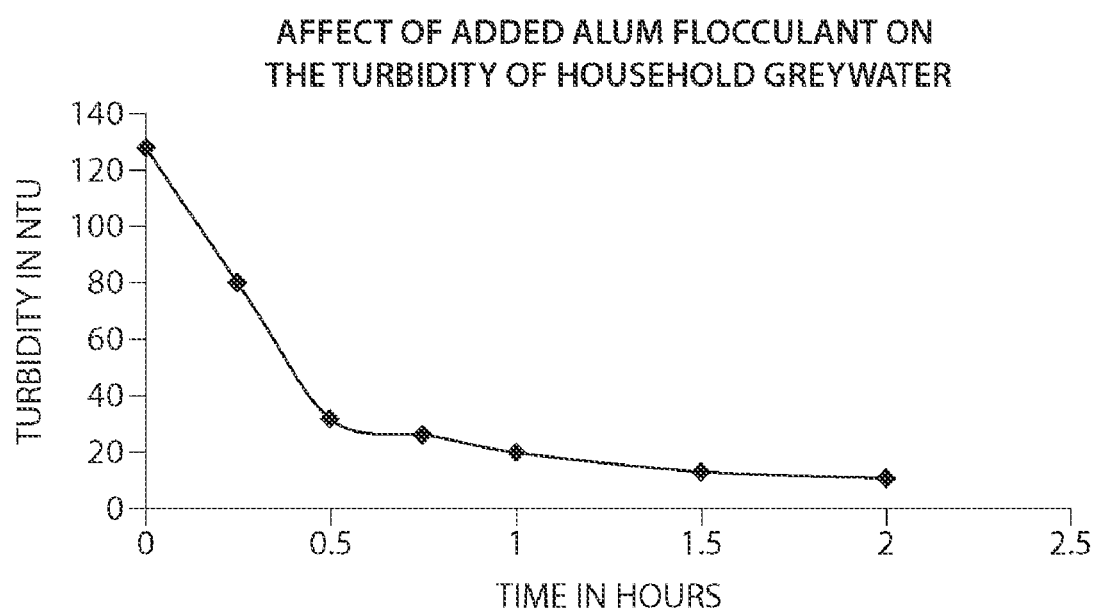
FIG. 4 shows the effect of alum flocculant on the turbidity of household grey water over 2 hours.

The relatively clear supernatant, with a pH of about 6.5, was decanted from the floc sediment and was then filtered through a 4 cm high Ballotini column, containing 90-150 micron glass spheres, under gravity filtration. The turbidity value after filtration was found to be 0.06, which is very close to pure, distilled water (0.02) and much better than required for drinking water (typically up to 3-5) (See FIG. 4).

Results from other, similar experiments indicate that, in general, the concentration of added aluminium sulphate should be close to the total dissolved solids in the grey water.

Figure 5B:
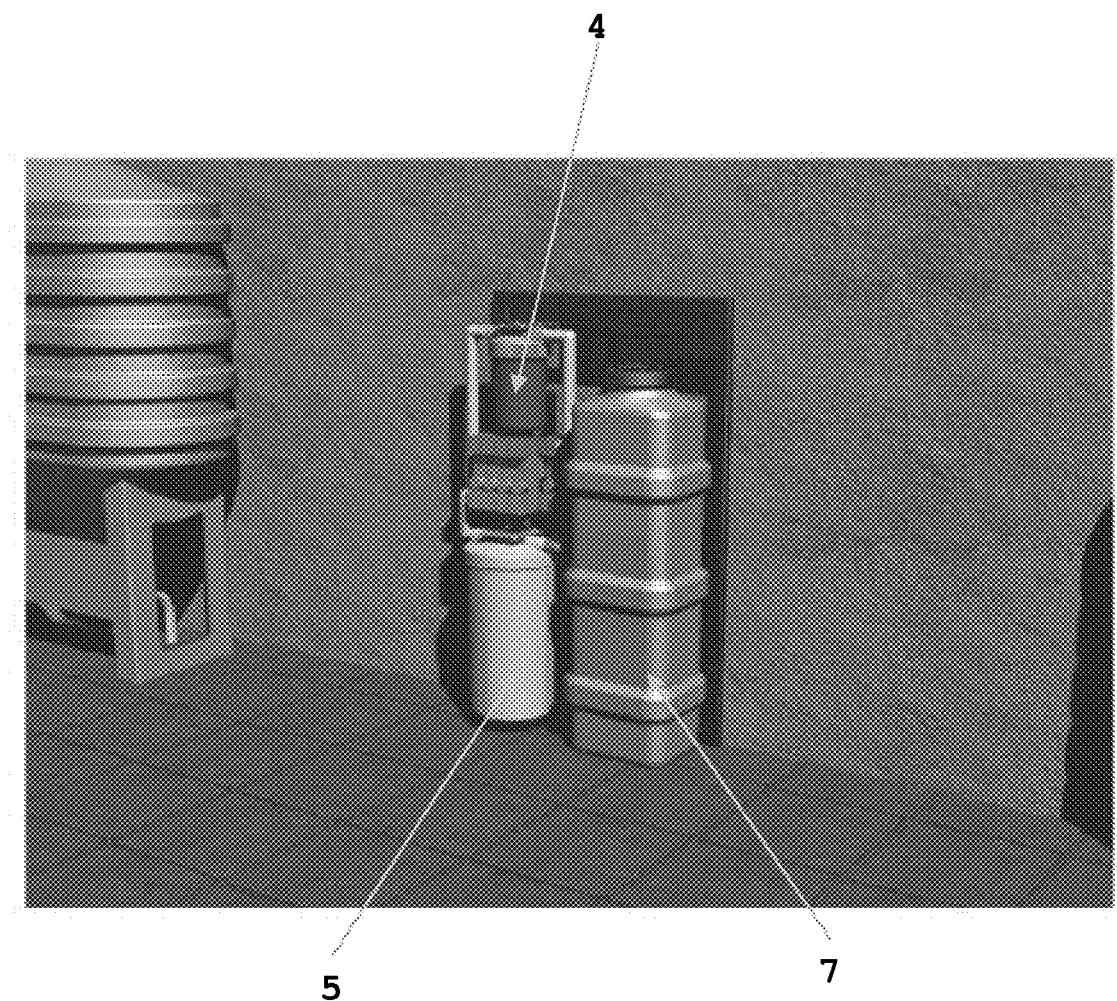

The apparatus in FIGS. 5(a) and 5(b) show:
i) a buried course hair and lint filter (1) connected by pipe to
ii) a surge sump tank (2) for holding the water; connected by pipe to
iii) a settling tank (3); connected by pipe to
iv) a Ballotini filter (4); connected by pipe to
v) a mixed bed active adsorption filter (5) containing an activated carbon medium, a zeolite medium and an aluminium medium; the mixed bed filter bed being connected by pipe to
vii) a re-use tank (6) for storing the purified water; and
viii) a chemical storage container (7) for the pH adjusting agent The pH adjusting region is between the surge sump tank (2) and the settling tank (3). The influent to the settling tank (3) is dosed with a pH adjusting agent such as aluminium sulfate housed in the chemical storage tank (6) to adjust the pH of the water. The chemical storage tank (6) feeds the pH adjusting agent to the pH adjusting region by way of in-line injection. The flocs separate in the settling tank (3) and at the end of the process are sent to the sewer via an outlet. Clear water is then pumped to a unit that houses a back washable Ballotini filter (4). The water is then passed through a unit that houses a mixed bed active adsorption filter (5) consisting of activated carbon, zeolite and alumina media (e.g. alox). From the mixed bed filter (5), the water is passed to a re-use tank (6), the final tank in the process. A pressure pump on the re-use tank (6) allows the water to be readily accessed for re-use, e.g the tank may feed a garden watering system or cistern. As an additional step, chlorine at levels of about 2-10 ppm may be added to the final storage (re-use) tank.

It will be appreciated that the Ballotini medium may be replaced with glass or silica powder of the same particle size.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

media and demonstrates the effectiveness of the method and apparatus of the present invention.

The invention claimed is:

1. A method for the removal of one or more cationic, anionic and/or nonionic surfactants from water, the method comprising:
   a) contacting the water with a pH adjusting agent/medium for a time and under conditions to provide a pH adjusted water;
   followed by contacting the pH adjusted water with one or more of the following active adsorption media:
   b) a first medium that has a negative charge in the pH adjusted water for a time and under conditions such that a proportion of cationic surfactants present in the water are adsorbed onto said medium and removed from the water;
   c) a second medium that has a positive charge in the pH adjusted water for a time and under conditions such that a proportion of anionic surfactants present in the water are adsorbed onto said medium and removed from the water; and
   d) a third medium that has a high surface area, is porous, adsorbs hydrophobic uncharged material and/or adsorbs hydrophobic charged material in the pH adjusted water, for a time and under conditions such that a proportion of non-ionic surfactants present in the water are adsorbed onto said medium and removed from the water,
   wherein the pH adjusting agent/medium is also a flocculant and floc precipitated from the pH adjusted water is removed prior to contacting the pH adjusted water with the one or more adsorption media.

2. The method of claim 1, wherein the first active adsorption medium includes silica.

3. The method of claim 2, wherein the second active adsorption medium includes alumina.

4. The method of claim 3, wherein the third active adsorption medium includes activated charcoal, graphite, anthracite or mixtures thereof.

5. The method of claim 4, wherein the first, second or third active adsorption medium is in the form of a powder, granule, pellet, sphere, disc, wafer, spiral or mixtures thereof.

6. An apparatus for removing one or more cationic, anionic and/or nonionic surfactants from water, the apparatus comprising:
   i) a pH adjusting region for contacting the water with a pH adjusting agent/medium to provide a pH adjusted water, wherein the pH adjusting agent/medium is also a flocculant that removes floc precipitated from the pH adjusted water;
   ii) one or more of the following active media:
      a) a medium that has a negative charge in the pH adjusted water for removing cationic surfactants;
      b) a medium that has a positive charge in the pH adjusted water for removing anionic surfactants;
      c) a medium that has a high surface area, is porous, adsorbs hydrophobic uncharged material and/or adsorbs hydrophobic charged material in the pH adjusted water, for removing non ionic surfactants,
      wherein one of the above active media is a first active medium having an inlet for the pH adjusted water and one of the above active media is a last active medium that has an outlet for the water; and
   iii) connective means to provide serial flow of the water from the pH adjusting region through to the last active medium.

7. An apparatus for removing one or more cationic, anionic and/or nonionic surfactants from grey water, the apparatus comprising:

i) an inlet for a pH adjusted water;
ii) one or more of the following active media:
   a) a medium that has a negative charge in the pH adjusted water for removing cationic surfactants;
   b) a medium that has a positive charge in the pH adjusted water for removing anionic surfactants;
   c) a medium that has a high surface area, is porous, adsorbs hydrophobic uncharged material and/or adsorbs hydrophobic charged material in the pH adjusted water, for removing non ionic surfactants,
   wherein one of the above active media is a first active medium having an inlet for the pH adjusted water and one of the above active media is a last active medium that has an outlet for the water; and
iii) connective means to provide serial flow of the water from the first active medium through to the last active medium.

8. A method of treating grey water comprising the following steps:
   i) passing the grey water through a filter of pore size in the range of 10-100 μm;
   ii) passing the grey water through a sediment filter;
   iii) providing a pH adjusted water by dosing the grey water with aluminum sulfate for a time or in an amount sufficient to provide a pH adjusted water having a pH in the range of about 3-7;
   wherein steps i) - iii) may take place in any order; followed by contacting the pH adjusted water with the following media:
   iv) silica for a time sufficient to remove a proportion of the cationic surfactants present in the water;
   v) clinoptilolite zeolite for a time sufficient to remove a proportion of ammonia and inorganic contaminants;
   vi) activated carbon impregnated with silver for a time sufficient to remove a proportion of non-ionic surfactants, organic and microbial contaminants, color and odor;
   vii) hydrated aluminum oxide for a time sufficient to remove a proportion of anionic surfactants and biological contaminants.

9. A method of removing one or more surfactants and one or more surfactant stabilized contaminants from grey water, the method comprising:
   a) dosing the water with an acid for a time sufficient to provide a pH adjusted water having a pH in the range of about 3-7, followed by contacting the pH adjusted water with one or more of the following active adsorption media:
   b) an anionic silica for a time and under conditions such that a proportion of cationic surfactants present in the water are adsorbed onto said medium and removed from the water;
   c) a cationic alumina medium for a time and under conditions such that a proportion of anionic surfactants present in the water are adsorbed onto said medium and removed from the water; and
   d) a high surface area/porous/hydrophobic activated charcoal medium for a time and under conditions such that a proportion of non ionic surfactants present in the water are adsorbed onto said medium and removed from the water.

10. The method of claim 9, wherein the activated charcoal, silica and alumina also remove a proportion of the biological contaminants present in the water.

11. The method of claim 9, wherein the activated charcoal removes a proportion of the organic contaminants present in the water.

12. A method of treating grey water comprising the following steps:
   i) passing the grey water through a filter;
   ii) providing a pH adjusted water by dosing the grey water with aluminum sulfate for a time sufficient or in an amount sufficient to provide a pH adjusted water having a pH in the range of about 3-7; followed by contacting the pH adjusted water with the following media
   iii) silica for a time sufficient to remove a proportion of the cationic surfactants present the water; followed by
   iv) activated carbon for a time sufficient to remove a proportion of non-ionic surfactants, organic and microbial contaminants, color and odor; followed by
   v) hydrated aluminum oxide for a time sufficient to remove a proportion of anionic surfactants and biological contaminants; followed by
   vi) clinoptilolite zeolite for a time sufficient to remove a proportion of ammonia and inorganic contaminants.

13. A method of treating grey water comprising the following steps:
   i) passing the grey water through a filter;
   ii) contacting the water with silica for a time sufficient to remove a proportion of the cationic surfactants present in the water;
   iii) followed by providing a pH adjusted water by dosing the grey water with aluminum sulfate for a time or in an amount sufficient to provide a pH adjusted water having a pH in the range of about 3-7;
   followed by contacting the pH adjusted water with the following media:
   iv) activated charcoal for a time sufficient to remove a proportion of non-ionic surfactants, organic and microbial contaminants, color and odor; followed by
   v) clinoptilolite zeolite for a time sufficient to remove a proportion of ammonia and inorganic contaminants; followed by
   vi) hydrated aluminum oxide for a time sufficient to remove a proportion of anionic surfactants and biological contaminants.

14. A method of treating grey water comprising the following steps:
   i) passing the grey water through a filter,
   ii) dosing the grey water with aluminum sulfate in an amount sufficient to provide a pH adjusted water having a pH in the range of about 3-7;
   followed by contacting the pH adjusted water with the following media:
   iii) a silica filter, for a time sufficient to remove a proportion of the cationic surfactants present in the water;
   iv) an activated carbon medium impregnated with silver for a time sufficient to remove a proportion of non-ionic surfactants, organic and microbial contaminants, color and odor;
   v) a zeolite medium for a time sufficient to remove a proportion of ammonia and inorganic contaminants;
   vi) a hydrated aluminum oxide medium for a time sufficient to remove a proportion of anionic surfactants and biological contaminants.

15. An apparatus for removing one or more cationic, anionic and/or nonionic surfactants and/or one or more organic, inorganic and/or biological contaminants from water, the apparatus comprising:
   a) a pH adjusting region in the form of a tank, pipe or cartridge wherein water in the tank, pipe or cartridge contacts a pH adjusting agent/medium to form a pH adjusted water having a pH in the range of about 3-7;

b) a silica containing cartridge having an inlet and an outlet, such that the pH adjusted water enters the cartridge via the inlet and upon contact of the water with the silica, a proportion of cationic contaminants present in the water are adsorbed onto said medium and removed from the water;

c) a zeolite containing cartridge having an inlet and outlet, such that the pH adjusted water enters the cartridge via the inlet and upon contact of the water with the zeolite a proportion of inorganic contaminants and ammonia present in the water are adsorbed onto said medium and removed from the water;

d) an activated carbon containing cartridge having an inlet and an outlet such that the pH adjusted water enters the cartridge via the inlet and upon contact of the water with the activated carbon, a proportion of non-ionic, organic and microbial contaminants present in the water are adsorbed onto said medium and removed from the water;

e) an aluminum oxide containing cartridge having an inlet and an outlet such that the pH adjusted water enters the cartridge via the inlet and upon contact of the water with the aluminum oxide, a proportion of anionic and biological contaminants present in the water are adsorbed onto said medium and removed from the water; and f) connective means to provide serial flow of the water from the silica containing cartridge through to the aluminum oxide containing cartridge.

16. An apparatus for removing one or more cationic, anionic and/or nonionic surfactants and/or one or more organic, inorganic and/or biological contaminants from water, the apparatus comprising:

a) a pH adjusting region in the form of a tank or pipe, wherein water in the tank or pipe contacts aluminum sulfate to form a pH adjusted water having a pH in the range of about 3-7;

b) a Ballotini glass filter having an inlet and an outlet such that upon contact of the pH adjusted water with the Ballotini glass, a proportion of cationic contaminants present in the water are removed from the water; followed by c) an activated carbon containing cartridge having an inlet and an outlet such that the pH adjusted water enters the cartridge via the inlet and upon contact of the water with the activated carbon, a proportion of non-ionic, organic and microbial contaminants present in the water are adsorbed onto said medium and removed from the water, followed by d) a zeolite containing cartridge having an inlet and an outlet, such that the pH adjusted water enters the cartridge via the inlet and upon contact of the water with the zeolite a proportion of inorganic contaminants and ammonia present in the water are adsorbed onto said medium and removed from the water; followed by e) an aluminum oxide containing cartridge having an inlet and an outlet such that the pH adjusted water enters the cartridge via the inlet and upon contact of the water with the aluminum oxide, a proportion of anionic and biological contaminants present in the water are adsorbed onto said medium and removed from the water; and f) connective means to provide serial flow of the water from the Ballotini glass filter through to the aluminum oxide containing cartridge.

17. An apparatus for removing one or more cationic, anionic and/or nonionic surfactants and/or one or more organic, inorganic and/or biological contaminants from water, the apparatus comprising:

a) a filter for filtering the water; connected to b) a holding tank for holding the water connected to c) a settling tank;

d) a pH adjusting region between the holding tank and settling tank for adjusting the pH of the water with a pH adjusting agent; wherein the settling tank is connected to e) a Ballotini filter; which is connected to f) a mixed bed active adsorption bed filter including an activated carbon medium, a zeolite medium and an alumina medium each medium being connected to one another via inlets and outlets, the mixed bed filter bed being connected to g) a re-use tank for storing water; and h) connective means to provide serial or parallel flow of the water from a) to g).

18. The apparatus of claim 17, wherein the pH adjusting agent is stored in a chemical storage tank and is introduced into the pH adjusting region by way of in-line pipe injection.

19. The method or apparatus of any one of claims 1, 2-5, 6 or 17, wherein the pH adjusting agent/medium is selected from one or more hydrolysable salts.

20. The method or apparatus of claim 19, wherein the pH adjusting agent/medium is aluminum chloride, ferric chloride, ferric nitrate or alum in the form of $Al_2(SO_4)_3$ or $KAl(SO_4)_2.12H_2O$.

21. The method or apparatus of claim 19, wherein the pH adjusting agent/medium adjusts the pH of the water to 3-7.

22. The method or apparatus of any one of claims 1, 2-5, or 15-18, wherein the water being treated is grey water.

23. The method or apparatus of claim 22, wherein the grey water is commercial grey water.

24. The method or apparatus of claim 22, wherein the grey water is domestic grey water.

25. The method or apparatus of any one of claims 7-14, wherein the grey water is from a bathroom, kitchen, laundry or combination thereof.

26. The apparatus of claim 15, wherein the pH adjusting agent/medium is one or more acids, one or more hydrolysable salts, an ion exchange medium, or any combination thereof.

27. The method or apparatus of claim 26, wherein the pH adjusting agent/medium is aluminum chloride, ferric chloride, ferric nitrate or alum in the form of $Al_2(SO_4)_3$ or $KAl(SO_4)_2.12H_2O$.

28. The method of claims 2-5, wherein the pH adjusted water is contacted with the media of steps b), c) and d).

29. The method of claim 28, wherein the pH adjusted water is sequentially contacted with the media of steps b), c) and d).

30. The apparatus of claim 6, wherein the pH adjusted water is contacted with the media of parts a), b) and c).

31. The apparatus of claim 30, wherein the pH adjusted water is sequentially contacted with the media of parts a), b) and c).

32. The method of claim 1, wherein the pH adjusted water is contacted with one or more of the following media:

a) one or more media for removing organic contaminants for a time and under conditions such that a proportion of the organic contaminants present in the water are adsorbed onto said media removed from the water;

b) one or more media for removing inorganic contaminants for a time and under conditions such that a proportion of the inorganic contaminants present in the water are adsorbed onto said media and removed from the water; and media and removed from the water, and c) one or more media for removing biological contaminants for a time and under conditions such that a proportion of the biological contaminants present in the water are adsorbed onto said media and removed from the water, and wherein a portion of one or more organic, inorganic and/or biological contaminants is removed from the treated water.

33. The apparatus of claim 6, further comprising one or more of the following active media:

a) one or more media for adsorbing organic contaminants from the water;

b) one or more media for adsorbing inorganic contaminants from the water; and c) one or more media for adsorbing biological contaminants from the water.

34. The apparatus of claim 7, further comprising one or more of the following active media:

a) one or more media for adsorbing organic contaminants from the water;

b) one or more media for adsorbing inorganic contaminants from the water; and c) one or more media for adsorbing biological contaminants from the water.

35. The method of claim 9, wherein the pH adjusted water is contacted with a zeolite medium for removing inorganic contaminants, the pH adjusted water contacting the zeolite medium for a time sufficient and under conditions such that a proportion of inorganic contaminants are adsorbed onto said medium and removed from the water.

36. The method of claim 14, wherein the filter of step (i) is a hair and lint filter.

37. The apparatus of claim 17, wherein the filter of step a) is a hair and lint filter.

\* \* \* \* \*